United States Patent
Centanni, Jr. et al.

(10) Patent No.: US 9,019,080 B2
(45) Date of Patent: Apr. 28, 2015

(54) USER COMMUNICATION DEVICE BASED CARD PRESENCE MONITORING AND ACCOUNT STATUS CONTROL

(75) Inventors: Jerome A. Centanni, Jr., Austin, TX (US); David J. Lerma, Pflugerville, TX (US); Jorge N. Yanez, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 340 days.

(21) Appl. No.: 13/450,748

(22) Filed: Apr. 19, 2012

(65) Prior Publication Data

US 2012/0303502 A1    Nov. 29, 2012

Related U.S. Application Data

(63) Continuation of application No. 13/115,473, filed on May 25, 2011, now abandoned.

(51) Int. Cl.
*H04Q 5/22* (2006.01)
*H04Q 9/00* (2006.01)

(52) U.S. Cl.
CPC ............. *H04Q 9/00* (2013.01); *H04Q 2209/47* (2013.01); *H04Q 2209/30* (2013.01)

(58) Field of Classification Search
None
See application file for complete search history.

(56) References Cited

U.S. PATENT DOCUMENTS

| | | | |
|---|---|---|---|
| 4,692,745 A | 9/1987 | Simanowitz | |
| 4,916,434 A | 4/1990 | McNeely | |
| 5,515,031 A | 5/1996 | Pereira et al. | |
| 6,400,270 B1 | 6/2002 | Person | |
| 6,490,443 B1 | 12/2002 | Freeny, Jr. | |
| 6,593,851 B1 * | 7/2003 | Bornstein | 340/539.15 |
| 7,503,489 B2 | 3/2009 | Heffez et al. | |
| 7,519,325 B2 | 4/2009 | Wakim | |
| 2002/0175820 A1 | 11/2002 | Oja et al. | |
| 2003/0065647 A1 | 4/2003 | Satomi et al. | |

(Continued)

FOREIGN PATENT DOCUMENTS

WO    90/13096    11/1990

OTHER PUBLICATIONS

Final Office Action, U.S. Appl. No. 13/115,473, filed May 25, 2011, In re Centanni, Jr., mailing date Sep. 19, 2013, 41 pages.

(Continued)

*Primary Examiner* — Brian Zimmerman
*Assistant Examiner* — Kevin Lau
(74) *Attorney, Agent, or Firm* — Steven L. Bennett; Amy J. Pattillo

(57) ABSTRACT

A sensor of a communication device detects whether a card associated with an account is present within a range. Responsive to the communication device detecting the card is outside the range of the sensor longer than a user specified time limit, the communication device sends a first communication to an account provider system via a network for the card to automatically place an account associated with the card on hold, wherein the account provider system blocks transactions to the account when the account is placed on hold. Responsive to the communication device detecting the card return within the range of the sensor, the communication device sends a second communication to the account provider system via the network to automatically reactivate the account associated with the card, wherein the account provider system allows transactions to the account when the account is reactivated.

19 Claims, 5 Drawing Sheets

(56) References Cited

U.S. PATENT DOCUMENTS

| | | | |
|---|---|---|---|
| 2005/0136912 A1* | 6/2005 | Curatolo et al. | 455/423 |
| 2005/0274793 A1* | 12/2005 | Cantini et al. | 235/379 |
| 2006/0136742 A1 | 6/2006 | Globbi | |
| 2006/0250255 A1* | 11/2006 | Flanagan | 340/573.4 |
| 2007/0187502 A1 | 8/2007 | Patel et al. | |
| 2007/0270128 A1 | 11/2007 | Kakiuchi | |
| 2008/0035725 A1 | 2/2008 | Jambunathan et al. | |
| 2008/0061974 A1 | 3/2008 | Rouille et al. | |
| 2009/0325593 A1* | 12/2009 | Do et al. | 455/456.1 |
| 2010/0112944 A1 | 5/2010 | Toshimitsu | |
| 2010/0155470 A1 | 6/2010 | Woronec | |
| 2011/0105064 A1* | 5/2011 | Kusano et al. | 455/129 |
| 2011/0251879 A1* | 10/2011 | Lambert et al. | 705/14.13 |

OTHER PUBLICATIONS

Pinpoint, How it Works, FAQ, accessed as of Apr. 26, 2011 from <http://www.pinpoint-fraud.com/how-it-works/faq>, 5 pages.

U.S. Appl. No. 13/115,473, filed May 25, 2011, Jerome A Centanni, Jr., International Business Machines Corporation, 41 pages.

Office Action, U.S. Appl. No. 13/115,473, filed May 25, 2011, In re Centanni, Jr., mailing date Mar. 14, 2013, 45 pages.

Notice of Allowance, U.S. Appl. No. 13/115,473, filed May 25, 2011, In re Centanni, Jr., mailing date Dec. 10, 2013, 15 pages.

* cited by examiner

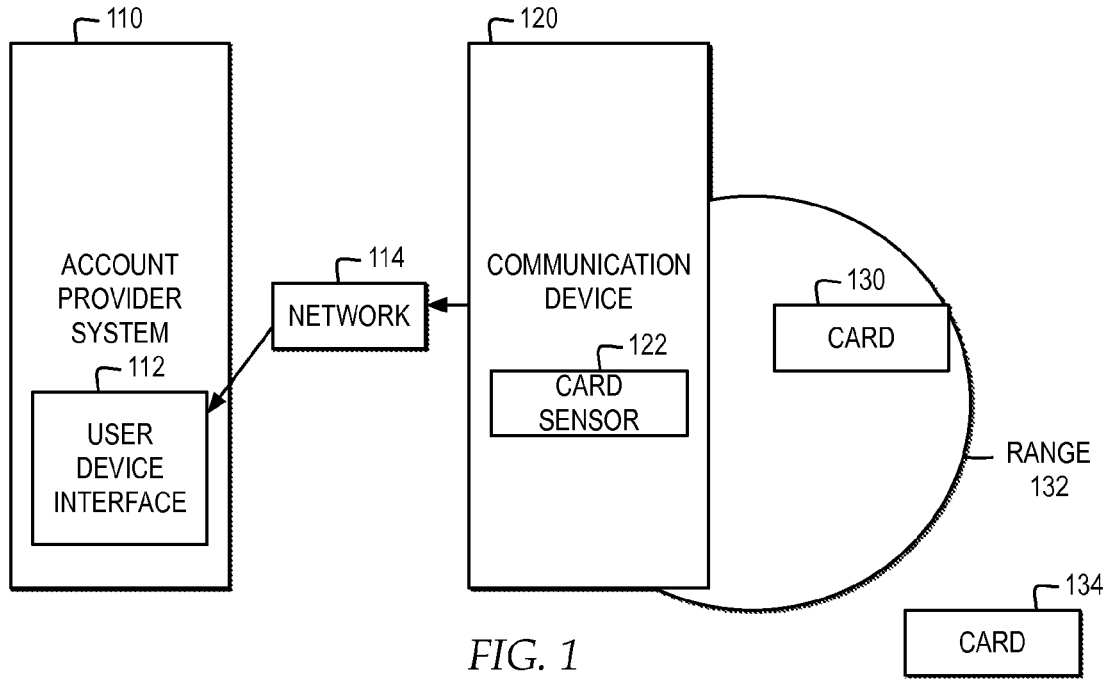
FIG. 1
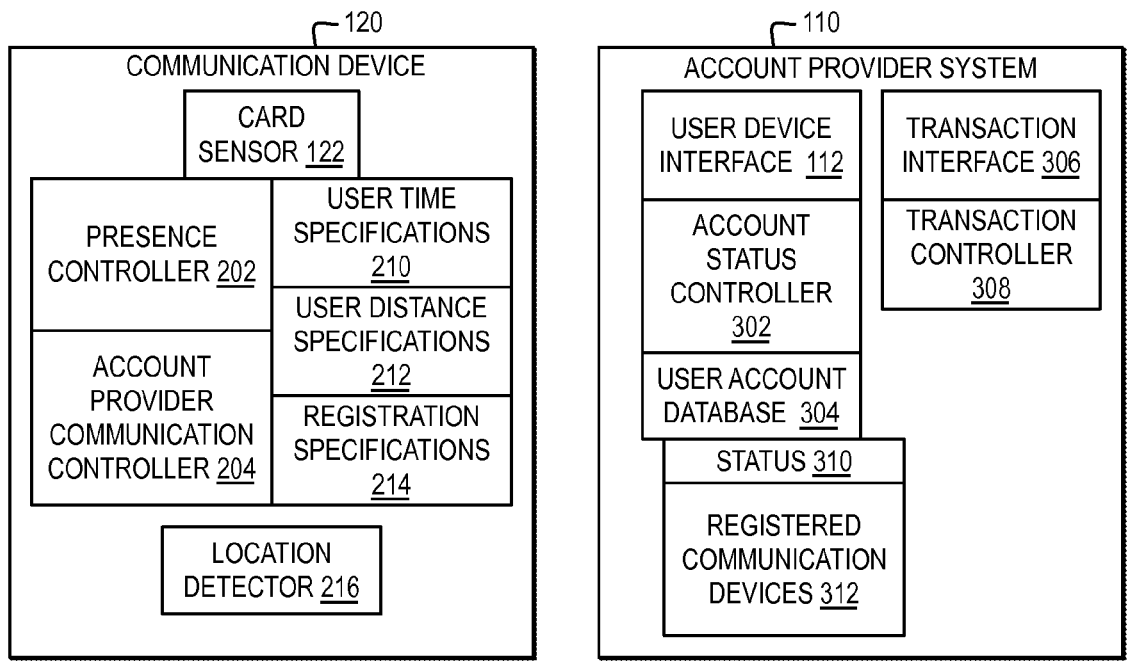
FIG. 2
FIG. 3

USER COMMUNICATION DEVICE BASED CARD PRESENCE MONITORING AND ACCOUNT STATUS CONTROL

CROSS REFERENCE TO RELATED APPLICATIONS

This application is a continuation of commonly assigned U.S. patent application Ser. No. 13/115,473, filed May 25, 2011, which is hereby incorporated herein by reference.

BACKGROUND

1. Technical Field

This invention relates in general to data processing systems and in particular to monitoring the presence of a portable card by a user communication device and updating the account provider maintained status of an account associated with the card from the user communication device.

2. Description of the Related Art

Many people carry at least one card with them each day, where that card is linked to an account. For example, consumers commonly carry credit cards and debit cards, where each credit card or debit card is linked to a separate financial account. In another example, identification cards are commonly carried by individuals and presented to gain entry into buildings, computer systems, or other points, where each identification card is linked to a profile or security setting for the individual.

One limitation of portable cards linked to an account is that the card can be a target for theft. In addition, another limitation of portable cards linked to an account is that a user may have to hand over a card to another person, such as a cashier, to complete a transaction or to place a purchase on hold, where the card may be forgotten, misplaced, or otherwise compromised when handed over. Currently, for a user to cancel an account linked to a card following loss of the card, the consumer must realize the card has been lost, whether by theft or misplacement, and then place a call to the company managing the account to request that the account be deactivated and the card invalidated.

BRIEF SUMMARY

In view of the foregoing, there is a need for a sensor of a communication device to detect whether a card is within a range of a user and to automatically alert an account provider that the card is away and the account associated with the card needs to be placed on hold, without requiring the user to realize the card is missing or requiring the user take steps to call the card account provider and report a card as missing. In addition, there is a need for the sensor to detect that the card has been returned to the user and for the communication device to automatically trigger the account provider to reactivate the account for the card, without requiring the user to take the steps to call the card account provider and without requiring the user to open a new account to replace the previous account.

According to one embodiment, a method for controlling a status of an account associated with a card is directed to detecting, by a sensor of a communication device, whether a portable card associated with an account for a user is present within a range, wherein the communication device is a portable communication device carried by the user that moves among a plurality of locations. The method is directed to, responsive to the sensor detecting the card, identifying, by the communication device, the card by a card identifier detected by the sensor. The method is directed to responsive to the sensor detecting the card, controlling, by the communication device, an interface with a first selectable option for the user to select to activate the card. The method is directed to, responsive to receiving a selection of the first selectable option by the user to activate the card, sending, by the communication device, a first request from the communication device to an account provider system to activate an account status for the card, wherein the account status is set to activated by the account provider system, wherein the account provider system authorizes transaction requests for transactions on the account associated with the card. The method is directed to, responsive to receiving an activation confirmation from the account provider system, controlling, by the communication device, the interface with a second selectable option for the user to associate the card by the card identifier with the communication device. The method is directed to, responsive to receiving a selection of the second selectable option by the user to associate the card identifier with the communication device, sending, by the communication device, a second request from the communication device to the account provider system to associate an identifier for the communication device with the account associated with the card. The method is directed to, responsive to receiving an association confirmation from the account provider system indicating the identifier for the communication device is associated with the account, updating, by the communication device, a status for the card as maintained by the communication device as associated. The method is directed to controlling, by the communication device, the interface with a third selectable option for the user to set limits specified for the card identifier only from among a plurality of cards associated with the communication device. The method is directed to, responsive to receiving a selection of the third selectable option by the user to associate a distance specified by the user as the range and to specify a time specified by the user as a user specified time limit, to set the range to the distance and to set the user specified time limit to the time specified by the user. The method is directed to synchronizing, by the communication device, the sensor of the communication device to detect the card when present within the range and to monitor a time the card is outside the range in comparison with the user specified time limit. The method is directed to, responsive to detecting the card outside the range of the sensor longer than the user specified time limit, detecting a first location of the communication device when the card is detected outside the range of the sensor and sending a first communication with the first location from the communication device to the account provider system via a network for the card to automatically place the account associated with the card on hold. The method is directed to, responsive to detecting the card return within the range of the sensor, detecting a second location of the communication device when the card is detected within the range of the sensor and sending a second communication with the second location from the communication device to the account provider system via the network to automatically reactivate the account associated with the card.

According to another embodiment, a system for controlling a status of an account associated with a card comprises a communication device comprising a sensor. The system comprises the sensor, operative to detect whether a portable card associated with an account for a user is present within a range, wherein the communication device is a portable communication device carried by the user that moves among a plurality of locations. The system comprises the communication device operative, responsive to the sensor detecting the card, to identify the card by a card identifier detected by the sensor. The system comprises the communication device operative, responsive to the sensor detecting the card, to control an interface with a first selectable option for the user to select to activate the card. The system comprises the communication device operative, responsive to receiving a selection of the first selectable option by the user to activate the card, to send a first request from the communication device to an account provider system to activate an account status for the card, wherein when the account status is set to activated by the account provider system, wherein the account provider system authorizes transaction requests for transactions on the account associated with the card. The system comprises the communication device operative, responsive to receiving an activation confirmation from the account provider system, to control the interface with a second selectable option for the user to associate the card by the card identifier with the communication device. The system comprises the communication device operative, responsive to receiving a selection of the second selectable option by the user to associate the card by the card identifier with the communication device, to send a second request from the communication device to the account provider system to associate an identifier for the communication device with the account associated with the card. The system comprises the communication device, responsive to receiving an association confirmation from the account provider system indicating the identifier for the communication device is associated with the account, operative to update a status for the card as maintained by the communication device as associated. The system comprises the communication device operative to control the interface with a third selectable option for the user to set limits specified for the card identifier only from among a plurality of cards associated with the communication device. The system comprises the communication device operative, responsive to receiving a selection of the third selectable option by the user to associate a distance specified by the user as the range and to specify a time specified by the user as a user specified time limit, to set the range to the distance and to set the user specified time limit to the time specified by the user. The system comprises the communication device operative to synchronize the sensor of the communication device to detect the card when present within the range and to monitor a time the card is outside the range in comparison with the user specified time limit. The system comprises the communication device, responsive to detecting the card outside the range of the sensor longer than the user specified time limit, operative to detect a first location of the communication device when the card is detected outside the range of the sensor and send a first communication with the first location from the communication device to the account provider system via a network for the card to automatically place the account associated with the card on hold. The system comprises the communication device, responsive to detecting the card return within the range of the sensor, operative to detect a second location of the communication device when the card is detected within the range of the sensor and send a second communication with the second location from the communication device to the account provider system via the network to automatically reactivate the account associated with the card.

According to another embodiment, a computer program product for controlling a status of an account associated with a card comprises a computer program product tangibly embodied in a non-transitory computer-readable storage medium. The computer-readable storage medium comprising computer executable instructions which cause a computer to detect, by a communication device, whether a portable card associated with an account for a user is present within a range, wherein the communication device is a portable communication device carried by the user that moves among a plurality of locations. The computer-readable storage medium comprising computer executable instructions which cause a computer to, responsive to the sensor detecting the card, identify the card by a card identifier detected by the sensor. The computer-readable storage medium comprising computer executable instructions which cause a computer to, responsive to the sensor detecting the card, control an interface with a first selectable option for the user to select to activate the card. The computer-readable storage medium comprising computer executable instructions which cause a computer to, responsive to receiving a selection of the first selectable option by the user to activate the card, send a first request from the communication device to an account provider system to activate an account status for the card, wherein when the account status is set to activated by the account provider system, wherein the account provider system authorizes transaction requests for transactions on the account associated with the card. The computer-readable storage medium comprising computer executable instructions which cause a computer to, responsive to receiving an activation confirmation from the account provider system, control the interface with a second selectable option for the user to associate the card by the card identifier with the communication device. The computer-readable storage medium comprising computer executable instructions which cause a computer to, responsive to receiving a selection of the second selectable option by the user to associate the card by the card identifier with the communication device, send a second request from the communication device to the account provider system to associate an identifier for the communication device with the account associated with the card. The computer-readable storage medium comprising computer executable instructions which cause a computer to, responsive to receiving an association confirmation from the account provider system indicating the identifier for the communication device is associated with the account, update a status for the card as maintained by the communication device as associated. The computer-readable storage medium comprising computer executable instructions which cause a computer to control the interface with a third selectable option for the user to set limits specified for the card identifier only from among a plurality of cards associated with the communication device. The computer-readable storage medium comprising computer executable instructions which cause a computer to, responsive to receiving a selection of the third selectable option by the user to associate a distance specified by the user as the range and to specify a time specified by the user as the user specified time limit, set the range to the distance and to set the user specified time limit to the time specified by the user. The computer-readable storage medium comprising computer executable instructions which cause a computer to synchronize the sensor of the communication device to detect the card when present within the range and to monitor a time the card is outside the range in comparison with the user specified time limit. The computer-readable storage medium comprising computer executable instructions which cause a computer to, responsive to detecting the card outside the range of the sensor longer than the user specified time limit, detect a first location of the communication device when the card is detected outside the range of the sensor and send a first communication with the first location from the communication device to the account provider system via a network for the card to automatically place the account associated with the card on hold. The computer-readable storage medium comprising computer executable instructions which cause a computer to, responsive to detecting the card return within the range of the sensor, detect a second location of the communication device when the card is detected within the range of the sensor and send a second communication with the second location from the communication device to the account provider system via the network to automatically reactivate the account associated with the card.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

FIG. 1 is a block diagram depicting a user portable communication device controlled card status system;

FIG. 2 is a block diagram illustrating one example of elements of a communication device for providing automated card status communications to an account provider for automated placing an account associated with a card on hold and automatically reactivating an account associated with the card;

FIG. 3 is a block diagram depicting one example of elements of an account provider system providing user specified communication device card status control;

DETAILED DESCRIPTION

Figure 4:
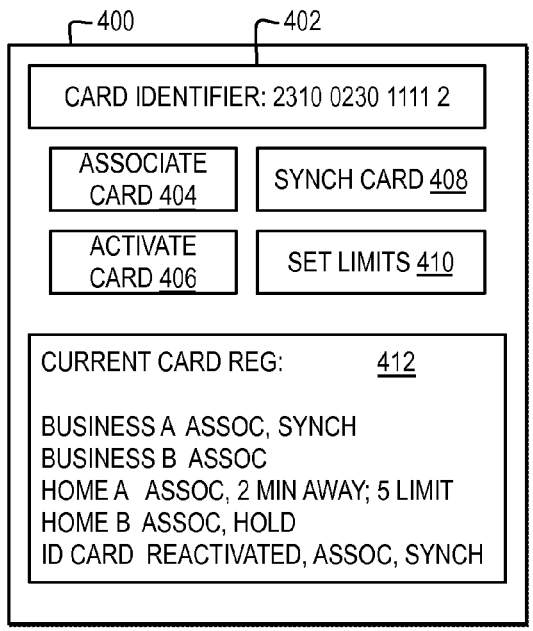
FIG. 4 is a block diagram illustrating one example of a communication device interface through which a user may select card presence monitoring preferences.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

With reference now FIG. 1, a block diagram illustrates a user portable communication device controlled card status system.

In the example, a card sensor 122 of a communication device 120 detects the presence of one or more cards, such as card 130 and card 134. In detecting the presence of one or more cards, such as card 130 and card 134, card sensor 122 detects when each card is initially present, detects each time each card is not detectable, and detects the return of a card. In addition, card sensor 122 may detect a unique identifier with a card to distinguish between one or more cards, such as distinguishing between card 130 and card 134 and to distinguish between cards registered with communication device 120 and cards not registered with communication device 120.

Card sensor 122 may implement a single sensor for detecting the presence of one or more cards or may implement multiple sensors for detecting the presence of one or more cards. Card 130 and card 134 may include or more types of proximity elements detectable by card sensor 122 and may include or more external elements, including, but not limited to, graphics, magnetic strips, and protruding numbers, that are readable or capturable by card sensor 122. Card sensor 122 may be implemented within communication device 120 or may be a removable device that is pluggable into one or more input and output interfaces of communication device 120. One of ordinary skill in the art will appreciate that card sensor 122 may detect the presence or lack of presence of card 130 and card 134 using multiple types of sensing elements and that card 130 and card 134 may include external characteristics, internal elements, or other elements that can be detected by card sensor 122.

In one example, card sensor 122 detects the presence of cards by detecting the presence of a detectable proximity element within or more cards within a range 132 and detects the identifier of a card by reading a unique identifier from the detectable proximity element. In the example illustrated, card sensor 122 detects the presence of card 130 within range 132 and detects the lack of presence of card 134, which is located outside range 132. As illustrated, for example, range 132 specifies the area within which card sensor 122 is set to detect the presence of cards. In one example, card sensor 122 may implement a transceiver that detects the presence of an RFID chip or other proximity element within card 130 or card 134 to detect the presence of a card when within the specified broadcast range of communication device 120 bound by range 132. In addition, card sensor 122 may have a broadcast range that is broader than range 132, but detect that card 130 is within the distance specified by range 132 and that card 134 is outside the distance specified by range 132.

In another example, card sensor 122 detects the presence of cards by detecting whether card 130 or card 134 are proximate to a detector of card sensor 122. For example, card sensor 122 may implement photosensitive or pressure sensitive detectors that detect whether card 130 is physically touching one of the detectors. When card sensor 122 detects the presence of a card proximate to a detector of card sensor 122, card sensor 122 may determine a unique identifier for the card multiple ways including, but not limited to, sensing the protruding identifier number from the card, reading a magnetic strip on the card, and reading the identifier from a chip on the card.

In another example, card sensor 122 detects the presence of card 130 using a camera or other imaging device that captures an image of card 130. In one example, card sensor 122 may compare the captured image of card 130 with one or more stored images of card 130 to estimate a distance of card 130 from card sensor 122 to determine whether card 130 is present within range 132. Card sensor 122 may determine a unique identifier for a card using an image capture device by reading a unique identifier or unique graphical element identifying the card from the captured image of the card.

In one example, range 132 may be set to a user specified distance that allows for the user to hand a card to a cashier in the normal course of use of the card without the card leaving range 132. In another example, range 132 may be set to a user specified distance that allows for the user to carry the card within handbag or pocket, within typical distance of a communication device, even if the user is communicating via the communication device, such that the user can converse and use the communication device in normal course without the card leaving range 132.

Communication device 120 communicates, through a network 114, with a user device interface 112 of an account provider system 110. In the example, communication device 120 sends a communication to account provider system 110 requesting to initially activate a card, requesting to associate a communication device with a card, requesting to temporarily place the account for a card on hold, and requesting to reactivate the account for the card previously placed on hold. User device interface 112 provides an interface through which account provider system 110 receives communications from multiple communication devices, such as communication device 120, providing updates and requesting adjustments to the activation status of a card.

Account provider system 110 may represent a system for one or more types of account entities including, but not limited to financial account providers, identity account providers, and other user account providers. Card 130 and card 134 may represent one or more types of individual identification devices including, but not limited to, credit cards, identification cards, and smart cards, issued by a card provider and linked to an account maintained by the account provider. An account may include multiple types of information or services including, but not limited to, a financial account, an individual identification account, and a security profile.

Network 114 is the medium used to provide communication links between various devices and computer systems. Network 114 may include permanent connections such as wire or fiber optics cables and temporary connections made through telephone connections and wireless transmission connections, for example. Network 114 may represent packet-switching based networks and telephone based networks, local area networks and wide area networks, and public networks and private networks. It will be understood that FIG. 1 is representative of one example of a distributed communication network for supporting an account provider system and multiple communication devices, however other network configurations and network components may be implemented.

As illustrated in FIG. 2, a block diagram illustrates one example of elements of a communication device for providing automated card status communications to an account provider for automated placing an account associated with a card on hold and automatically reactivating an account associated with the card.

As illustrated, communication device 120 includes card sensor 122, which may include software and hardware for sensing the presence or lack of presence of one or more cards at one or more ranges. In addition, communication device 120 may include a presence controller 202 and an account provider communication controller 204.

Presence controller 202 specifies an interface through which a user requests to associate a card with communication device 120 at an account provider system. The user may enter a unique identifier, account provider, and other information for the card or card sensor 122 may detect the information for the card and provide the detected information to the user for verification. Presence controller 202 triggers account provider communication controller 204 to send a status update communication to an account provider requesting that the account provider associate the identifier for communication device 120 with the account assigned to the card. In addition, as part of the association request, presence controller 202 may also provide an option for a user to request to activate the account assigned to the card with the request to associate the identifier for communication device 120 with the account, if the account associated with the card is not already activated. Account provider communication controller 204 may implement multiple types of communication protocols for controlling secured communications with multiple types of account providers.

An identifier for communication device 120 may include, but is not limited to, a telephone number, an account number, or other unique identifier. Presence controller 202 stores card identifiers, account provider identifiers, and association confirmations for each associated card in registration specifications 214.

In addition, presence controller 202 specifies an interface through which a user selects to synchronize a card with communication device 120. When a user selects to synchronize an associated card with card sensor 122, card sensor 122 monitors for the presence or lack of presence of each synchronized card. In one example, presence controller 202 synchronizes card sensor 122 with each associated card by placing the associated card within range 132 and verifying that card sensor 122 correctly detects the card. In particular, presence controller 202 may synchronize card sensor 122 with the associated card by directing card sensor 122 to detect the presence of an identifier broadcast from a proximity element within the associated card, such as an RFID. When a user selects to synchronize a card with communication device 120, presence controller 202 updates the record for the card in registration specifications 214 to indicate that the card is currently synchronized with communication device 120.

Presence controller 202 also specifies an interface through which a user may select the time limits and distance limits for application to one or more cards and stores user specified time limits in user time specifications 210 and user specified distance limits in user distance specifications 212. User time specifications 210 specify one or more time limits for the amount of time a card can be away from and outside a range specified by the user specified distance limits. In particular, when a card is synchronized to card sensor 122, presence controller 202 tracks whether the card is physically within range 132 of card sensor 122, where range 132 is specified by the user in user specified distance limits.

In particular, as a user selects user distance specifications 212, presence controller 122 may specify distance options according to the distances available through card sensor 122, which may represent multiple types of card sensors. For example, communication device 120 may include a built in short range card sensor, but the user may temporarily plug a long range card sensor into communication device 120 and presence controller 202 provides the user with the option to select from among the distance available from the short range card sensor or the distance available from the long range card sensor.

In addition, as a user selects user distance specifications 212, the user may also specify the frequency at which card sensor 122 checks for the presence of a card. For example, if card sensor 122 periodically sends a broadcast signal to detect the presence of cards within the broadcast range, the user may also specify the frequency that the broadcast signals are sent. Presence controller 202 may also estimate and display the amount of battery to be consumed by card sensor 122, further specified by the frequency that the broadcast signals are sent, such that a user may select a broadcast frequency in view of power supply constraints for communication device 120.

Further, as a user selects user distance specifications 212, the user may also specify the reliability of the sensing performing by card sensor 122 and may select from among multiple card sensors, where each card sensor has a different reliability factor. For example, a card sensor implementing an RFID reader may be less reliable in sensing the presence of a card than a card sensor implementing a power based reader because the RFID reader broadcast may experience interference.

When card sensor 122 detects that a card is no longer present within the range specified by the user specified distance limits, presence controller 202 triggers a timer to count how long the card is beyond the user specified distance limits. Presence controller 202 may control multiple timers, each assigned to a specific card. For example, presence controller 202 may start a first timer when card 134 is detected as no longer present within range 132 and may start a second timer if card 130 is also detected as no longer present within range 132. In addition, presence controller 202 may output an alert to the user via an output interface of communication device 120 indicating the card has left range 132 and showing the timer counting down the amount of time the card is permitted to be outside range 132 before a hold status communication is sent to the account provider system for the card.

When presence controller 202 starts timing how long a card is beyond a user specified distance limit, if card sensor 122 does not detect a card returned back within range 132 before the timer reaches the user specified time limits, then presence controller 202 triggers account provider communication controller 204 to send a status update communication for the account associated with the card to the account provider for the card, requesting that the account provider temporarily place the account on hold. The status update communication may specify the time when the card initially left range 132, the amount of time the card has been away, and the location of the communication device when the card was detected as away. In addition, presence controller 202 may output an alert to the user via an output interface of communication device 120 indicating the lack of presence of the card and provide options for a user to elect to track the location of the card or send a status update communication to the account provider system indicating the card has been lost or stolen.

When account provider communication controller 204 sends a hold status update, presence controller 202 may track whether a hold confirmation is received from the account provider. If a hold confirmation is not received from the account provider within a specified period of time, presence controller 202 may output an alert to the user via communication device 120 indicating the lack of a confirmation that the account associated with the card is placed on hold.

If a card has been outside the user specified distance limit for a time longer than the user specified time limit and card sensor 122 detects the card returned back within range 132 after the hold status update is sent for the account associated with the card, presence controller 202 triggers account provider communication controller 204 to send a status update communication for the account associated with the card to the account provider for the card, requesting a reactivation of the account associated with the card. In addition, if a card has been outside the user specified distance limit for a time longer than the user specified time limit, the user may request that card sensor 122 resynchronize with the card with the card is returned to the user, wherein during resynchronization, the card sensor 122 detects the card returned back within range 132.

A user may also select a preference for presence controller 202 to provide an alert to the user via an interface of communication device 120 once the card is back within rang 132 and wait for a user to request to send the reactivation status update for the card. In addition, a user may select a preference for presence controller 202 to request to the account provider system for any transactions or attempted transactions recorded during the time from which the card was first detected outside range 132 until the card was returned.

In setting time specifications and distance specifications, a user may select to base a time or distance on one or more factors including, but not limited to, time of day, location, mode of transportation, type of account, and other factors that are detectable by communication device 120. For example, a user may select a time limit of twenty minutes and a range of twenty feet during daytime hours and a time limit of ten minutes and a range of five feet during nighttime hours, wherein presence controller 202 calculates a current time limit and current distance limit for a card based on the current time of day. In another example, a user may select a time limit of twenty minutes in general, but a time limit of one minute if the user is at certain locations. In another example, a user may select a first time limit for all individual cards and a second time limit for all business cards.

As to tracking the location of communication device 120, presence controller 202 may store the location of communication device 120 in registration specifications 214, as tracked by a location detector 216, at multiple points in time. For example, presence controller 202 may store the location of communication device 120 in registration specifications 214 when a card is synched, when a card is detected as away and when a card is detected as returned. Location detector 216 may represent a global position system tracker or the component enabled to track, calculate, or predict the position of communication device 120.

By providing card sensor 122 with communication device 120 for sensing whether a card is present or outside of a range and by providing presence controller 102 for allowing the user to specify the range and the amount of time a card can be outside the range before a hold request is set, a user may elect to use communication device 120 to provide an extra level of security for the account associated with the card and the user may customize aspects of the security, including range and time limitations. In addition, by establishing communication device 120 as the communication interface through which automated status requests sent to an account provider automatically adjust the status of the account associated with a card, the portable communication device carried by a user may send status updates to automatically place a hold on an account and automatically reactivate an account associated with a card without requiring a user to call an account provider and without requiring a user to disclose account information to a third party fraud service to receive fraud protection. In addition, by providing a hold status and by providing for a reactivation of an account placed on hold, through communications received from communication device 120, the user is provided with options for protecting an account associated with a card other than the traditional deactivation of an account and requirement that a user open a new account.

With reference now to FIG. 3, a block diagram illustrates one example of elements of an account provider system providing user specified communication device card status control.

In the example, account provider system 110 includes user device interface 112 that provides an interface for receiving automated status update communications from communication devices requesting changes to the status of an account associated with a card, such as from communication device 120. Account provider system 110 may also include a transaction interface 306 that provides an interface for receiving and responding to vendors and other parties submitting transaction requests for a particular user account. In another example, user device interface 112 and transaction interface 306 may be implemented together.

Account provider system 110 also includes an account status controller 302 for controlling the settings in a status 310 and registered communication devices 312 set in each user account within user account database 304. The setting within status 310 includes, but is not limited to, not yet activated, activated, on hold, deactivated, reactivated.

Account provider system 110 may receive communications for updating an account status through multiple inputs. For example, account provider system 110 may receive communications for updating an account status from a telephone system through which a user calls a customer service representative or automated system and requests to change the status of an account associated with a card. In another example, account provider system 110 may receive communications for updating an account status from a fraud detection system implemented by account provider system that monitors the transactions received by transaction receiver 306, predicts fraudulent activity, and changes status 310 for an account when fraudulent activity is predicted. Further, in the example, account provider system 110 includes user device interface 112 for specifically receiving automated status update communications from user communication devices requesting a change to the setting in status 310 for an account associated with a card based on the presence or absence of the card.

In the example, user device interface 112 receives status update communications from one or more communication devices and passes the communications on to account status controller 302. Status update communications may include, but are not limited to, a request to authorize an account associated with a card, a request to associate a communication device with an account, a request to temporarily place a hold on an account, a request to report a lost card, and a request to reactivate an account.

Account status controller 302 may receive a status update communication through user device interface 112 requesting to authorize a card in association with an account. Account status controller 302 determines what information is needed to authorize the card and sends the requested information through user device interface 112 to communication device 120. When account status controller 302 has verified that the user requesting to activate an account is authorized to activate the account via communication device 120, account status controller 302 updates status 310 for the account with a status of "activated". When an account status is set to "activated", transaction controller 308 authorizes transaction requests for the account.

In addition, account status controller 302 may receive a status update communication through user device interface 112 requesting to associate a communication device with an account. Account status controller 302 adds an identifier for the communication device to registered communication devices 312 for the account. When account status controller 302 has verified that a communication device is associated with an account, account status controller 302 may send an association confirmation to the communication device.

In addition, account status controller 302 may receive a status update communication through user device interface 112 requesting to place a hold on the account associated with a particular communication device, from the particular communication device. Account status controller 302 verifies that the particular communication device is associated with the account in registered communication devices 312 for a particular account and if the particular communication device is associated with the account, sets status 310 for the particular account to a status of "hold" and may send a hold confirmation to the communication device. When an account status is set to "hold", transaction controller 308 denies transaction requests for the account. The "hold" account status sets the account temporarily on hold, without cancelling or fully deactivating the account.

In one example, as additional protection, if the status update communication requesting to place a hold on an account includes the leave time when the card associated with the account left range 132, account status controller 302 may track any incoming transaction requests through transaction controller 306 for the account from the leave time until the hold time and automatically flag the incoming transaction requests as possible fraudulent activity. In addition, account status controller 302 may send a communication with the incoming transaction requests to the communication device requesting the user to verify that the user authorized the incoming transaction requests.

In addition, account status controller 302 may receive a status update communication through user device interface 112 requesting to reactivate the account associated with a particular communication device, from the particular communication device. Account status controller 302 verifies the particular communication device is associated with the account in registered communication devices 312 for a particular account and if the particular communication device is associated with the account, sets status 310 for the particular account to a status of "reactivated" and may send a reactivation confirmation to the communication device. When an account is set to "reactivated", transaction controller 308 allows transaction requests for the account again.

A user may also request that an account status not be adjustable through status update communications received from communication devices through user device interface 112. As account status controller 302 receives status update communications, account status controller 302 may determine that an account is set to not enable status adjustments through status update communications from communication devices and, if status update communications are received for the account, account status controller 302 may flag an account for potential fraud or set the status of the account to "hold".

Referring now to FIG. 4, a block diagram illustrates one example of a communication device interface through which a user may select card presence monitoring preferences.

In the example, an interface 400 of a user communication device displays the identifier of a new card, as illustrated at reference numeral 402. In one example, a user may enter the identifier for the new card. In another example, card sensor 122 may detect or read the identifier for the new card.

In the example, interface 400 includes multiple selectable options for a user to select card presence monitoring preferences by card. For example, interface 400 includes selectable options of associate card 404, activate card 406, synch card 408, and set limits 410.

If the new card identified at reference numeral 402 is not already activated, the user may select activate card 406 to trigger presence controller 202 to send a status update communication to the account provider system for the new card and initiate activation of the new card. If the new card is already activated, the user may select associate card 404 to trigger presence controller 202 to send a status update communication to the account provider system for the new card and request to associate the communication device with the card at the account provider system. If the new card is already associated, the user may select synch card 408 to trigger presence controller 202 to synchronize the communication device with the new card such that card sensor 122 monitors for the presence and lack of presence of the new card. In selecting to synchronize the communication device with the new card, a user may also select set limits 410 to specify particular time limits and distance limits for the new card. If the user does not set specific limits for the new card, the user's general specified time limits or distance limits, as specified in user time specifications 210 and user distance specifications 212, apply to the new card.

In the example, associate card 404 option and synch card 408 options are illustrated as separate selectable options. In one example, a user may select to associate multiple cards with a communication device through selection of associate card 404, but selectively elect to synchronize the cards through selection of synch card 408. In another example, when a user associates a card through selection of associate card 404, presence controller 202 may automatically synchronize the card and when a card returns after being outside range 132, presence controller 202 may automatically synchronize the card.

As illustrated in current card registration status interface 412, the current user monitoring preferences and current status of each card, as maintained in registration specifications 214, is displayed. In the example, a user has registered cards labeled "business A", "business B", "home A" and "home B" with the communication device.

As illustrated within registration status interface 412, the registration information for the card labeled "business A" indicates that the user associated the communication device with the card at the account provider as indicated by "assoc", that the card is synchronized and within range as indicated by "synch". Since the card labeled "business A" is synchronized with the communication device, presence controller 202 actively monitors for the presence of the "business A" card within the distance limits set for the "business A" card.

In addition, as illustrated within registration status interface 412, the registration information for the card labeled "business B" indicates that the user associated the card at the account provider for the card as indicated by "assoc", but that the card is not currently synchronized with the communication device.

In addition, as illustrated within registration status interface 412, the registration information for the card labeled "home A" is associated and synchronized, but the card is detected as not present and has been away from the communication device for 2 minutes as indicated by "2 min away". In addition, the registration information for the card indicates that the user specified time limit for the card is 5 minutes, where when the away time tracked for the card reaches 5 minutes, presence controller 202 will send a status update communication for "home A" to the account provider requesting to place a hold on the account associated with the card unless the card is returned.

In addition, as illustrated within registration status interface 412, the registration information for the card labeled "home B" indicates that the user associated the card at the account provider for the card as indicated by "assoc", and that the account for the card has been placed on hold at the account provider as indicated by "hold". When the away time tracked for the card labeled "home B" exceeded the user specified time limit, presence controller 202 sent a status update communication to the account provider for the card requesting the account associated with the card be placed on hold. Once a card is marked as "hold", the communication device monitors for the return of the card within the user specified distance limits, and if the card returns, presence controller 202 sends a status update communication to the account provider requesting reactivation of the card. If the card labeled "home B" is reactivated and the card synchronized, the status of the card in current card registration 412 will update from "hold" to "synch".

In addition, as illustrated within registration status interface 412, the registration information for the card labeled "ID card" indicates that the user associated the card at the account provider for the card as indicated by "assoc", that the card has been reactivated after being temporarily placed on hold as indicated by "reactivated", and that the card has been synchronized with the communication device as indicated by "synch". The "reactivated" status indicates that the card was away from the user defined range for a time period longer than the user defined time limit for the card, but was returned and the account associated with the card automatically reactivated by the communication device status update communication.

Figure 5:
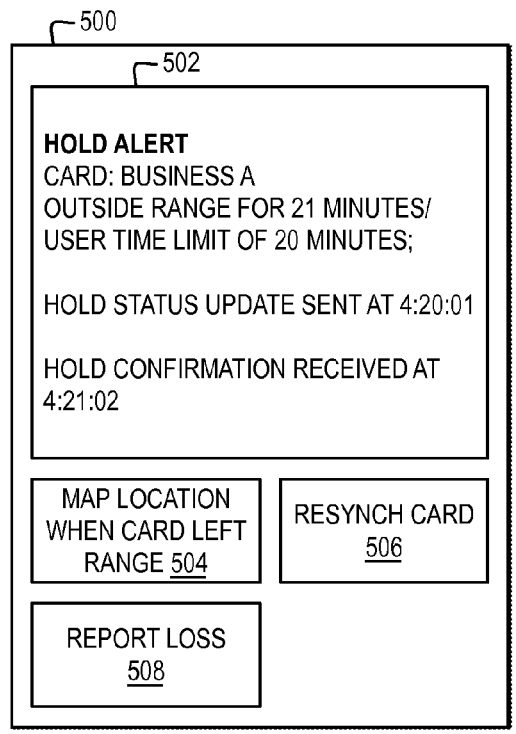
FIG. 5 is a block diagram depicting one example of a communication device interface through which a user receives an alert when a card that was synchronized to the communication device is no longer present.

With reference now to FIG. 5, a block diagram illustrates one example of a communication device interface through which a user receives an alert when a card that was synchronized to the communication device is no longer present.

In the example, an interface 500 of a user communication device includes an alert interface 502 specifying an identifier for the card that is no longer present within the user specified range, specifying the amount of time the card has been outside the user specified range, specifying the user specified time limit for the card, specifying the time that a hold status update communication was sent to the account provider for the card, and specifying the time that a hold confirmation was received from the account provider. In addition to displaying an alert within interface 500, presence controller 202 may control output of an alert through other output interfaces of the communication device.

In addition, in the example, the user is provided multiple selectable options. In one example, the user may select a location option 504 to trigger presence controller 202 to map the location of the communication device when the card left the range to aid the user in locating the card. In one example, when a user selects location option 504, presence controller 202 accesses a location tracked when the card left the range and triggers a mapping function to generate a map within interface 500 showing the tracked location. In another example, the user may select resynch card 506 to trigger presence controller 202 to resynch a card to the communication device if the user is in possession of the card and card sensor 122 does not automatically sense the presence of the card. In yet another example, the user may select report loss 508 to trigger presence controller 202 to send a status update communication requesting to report a card as lost or stolen. In particular, if a user sees alert interface 502 indicating the account for the card has been placed on hold and the user cannot locate the card, the user may report the loss to the account provider.

Figure 6:
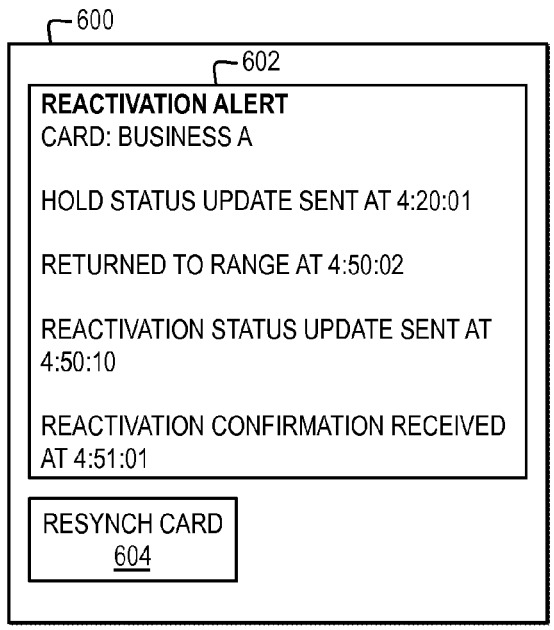
FIG. 6 is a block diagram illustrating one example of a communication device interface through which a user receives an alert when a card that was away and placed on hold is returned and reactivated.

With reference now to FIG. 6, a block diagram illustrates one example of a communication device interface through which a user receives an alert when a card that was away and temporarily placed on hold is returned and reactivated. In the example, as illustrated, an interface 600 of a user communication device includes an alert interface 602 for alerting a user when a card has been returned with a range specified by a user defined distance limit and when the card has been automatically reactivated with an account provider for the card by a status update communication sent by the communication device to the account provider. As illustrated within alert interface 602, a reactivation alert may include an identifier for a card, a time that the hold status update communication was sent, a time when the card was detected within range again, and a time when the reactivation status update communication was sent to the account provider, and a time when the reactivation confirmation was received from the account provider. In addition, interface 600 includes a selectable option of resynch card 604 that a user selects to trigger presence controller 202 to synchronize the returned card with card sensor 122 for triggering card sensor 122 to monitor the presence of the card again. In addition, a user may select to automatically synchronize a card when the card is returned.

Figure 7:
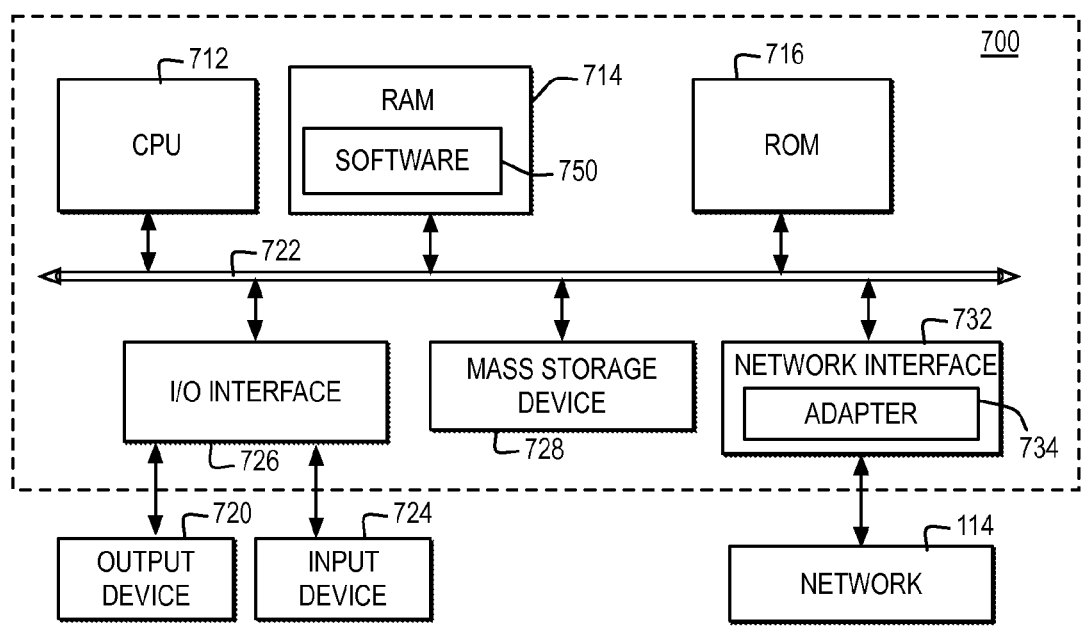
FIG. 7 is a block diagram depicting one example of a computer system in which the present invention may be implemented.

FIG. 7 illustrates one example of a computer system in which the present invention may be implemented. The present invention may be performed in a variety of systems and combinations of systems, made up of functional components, such as the functional components described with reference to computer system 700 and may be communicatively connected to a network, such as network 114. In one example, each of account provider system 110, communication device 120, card 130, and card 134 may implement one or more of the functional components described with reference to computer system 700.

Computer system 700 includes a bus 722 or other communication device for communicating information within computer system 700, and at least one hardware processing device, such as processor 712, coupled to bus 722 for processing information. Bus 722 preferably includes low-latency and higher latency paths that are connected by bridges and adapters and controlled within computer system 700 by multiple bus controllers. When implemented as a server or node, computer system 700 may include multiple processors designed to improve network servicing power. Where multiple processors share bus 522, additional controllers (not depicted) for managing bus access and locks may be implemented.

Processor 712 may be at least one general-purpose processor such as IBM® PowerPC® (IBM and PowerPC are registered trademarks of International Business Machines Corporation) processor that, during normal operation, processes data under the control of software 750, which may include at least one of application software, an operating system, middleware, and other code and computer executable programs accessible from a dynamic storage device such as random access memory (RAM) 714, a static storage device such as Read Only Memory (ROM) 716, a data storage device, such as mass storage device 718, or other data storage medium. Software 750 may include, but is not limited to, code, applications, protocols, interfaces, and processes for controlling one or more systems, including, but not limited to, account provider system 110 and communication device 120.

Figure 8:
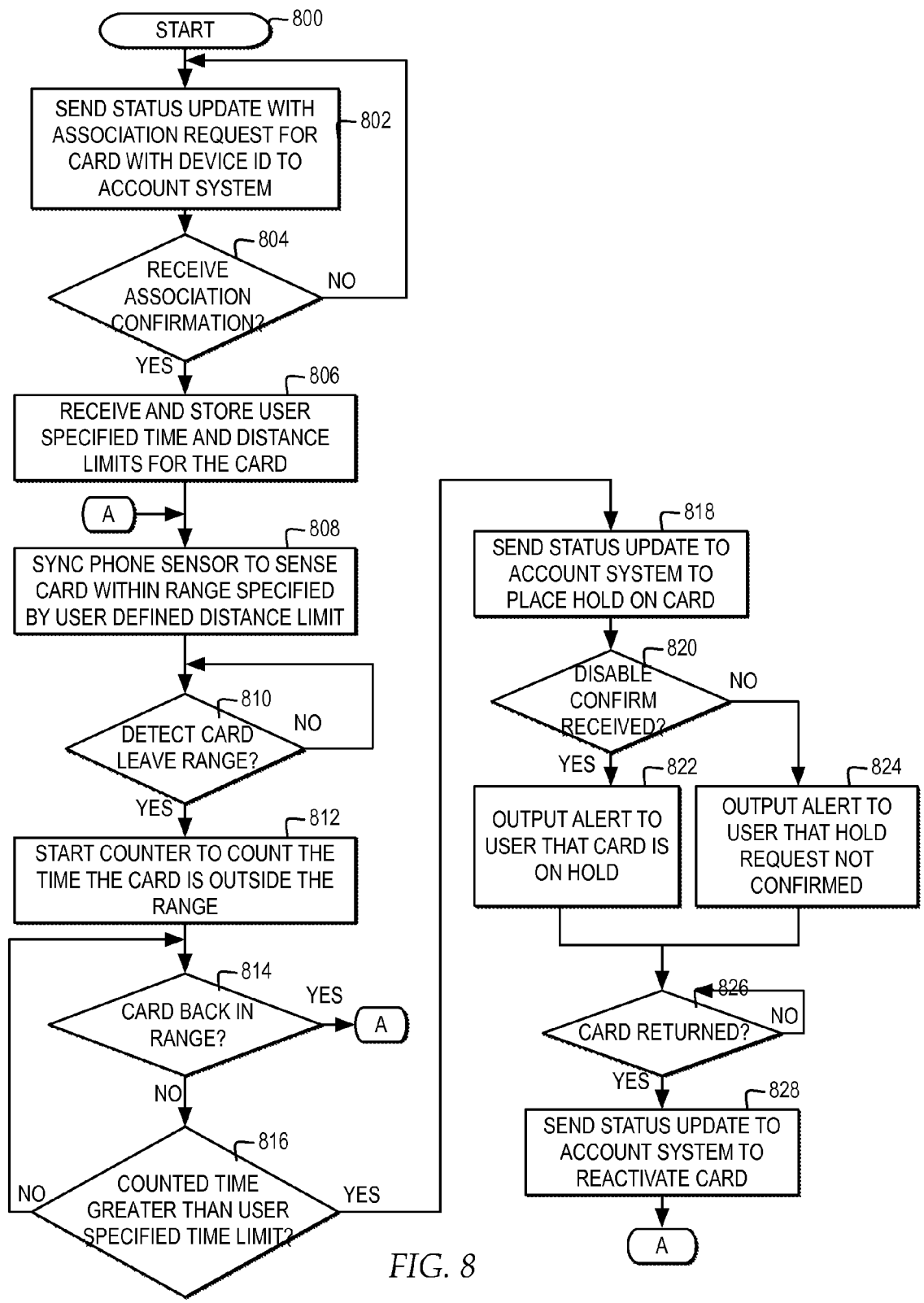
FIG. 8 is a high level logic flowchart illustrating a process and program for managing card status updates by a communication device that monitors for the presence of a card.
Figure 9:
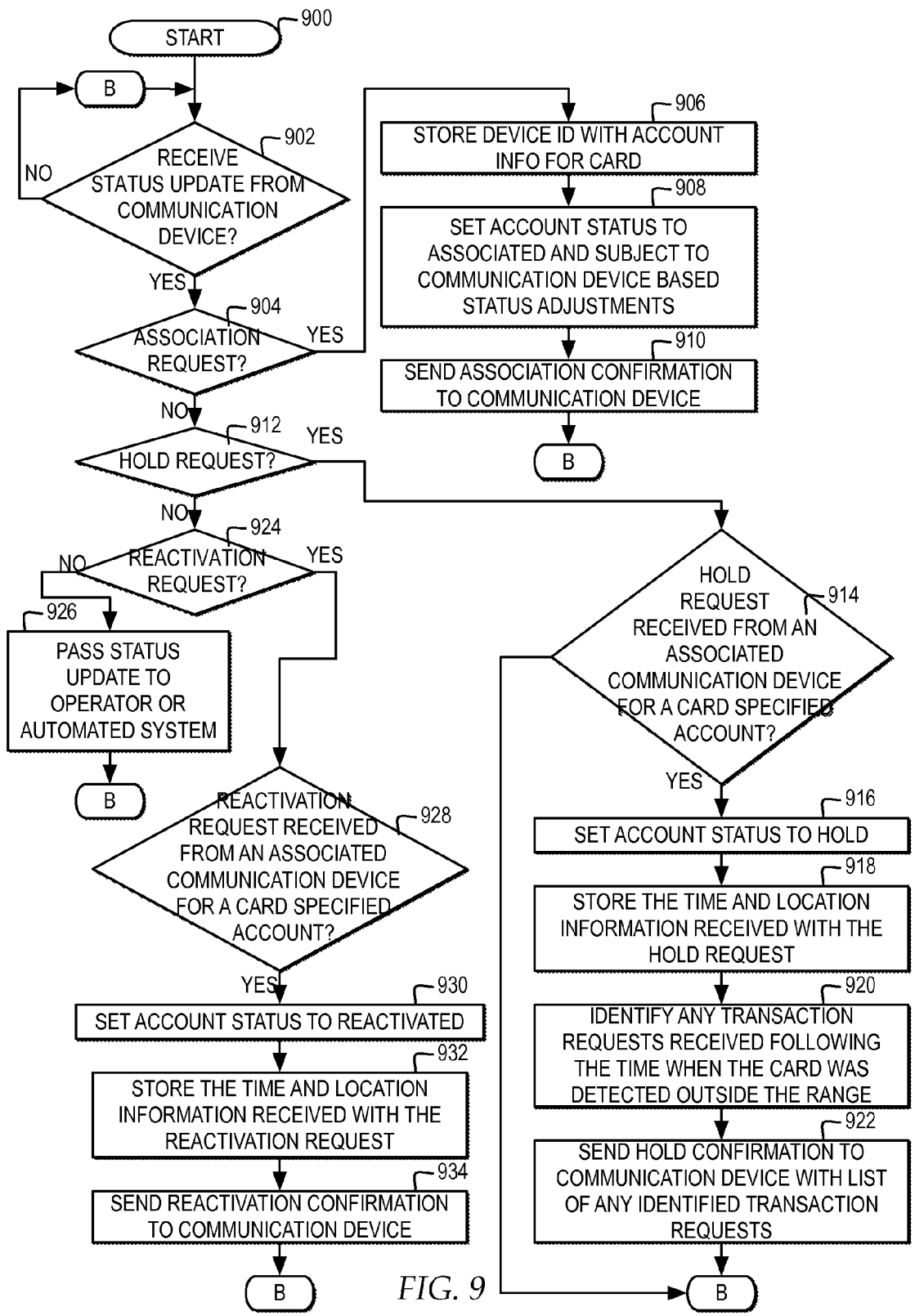
FIG. 9 is a high level logic flowchart illustrating a process and program for managing a user account associated with a card responsive to status updates received from a user communication device associated with the card.

In one embodiment, the operations performed by processor 712 may control the operations of flowchart of FIGS. 8 and 9 and other operations described herein. Operations performed by processor 712 may be requested by software 750 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 718, a random access memory (RAM), such as RAM 714, a read-only memory (ROM) 716, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, such as computer system 700, partly on the user's computer, as a stand-alone software package, partly on the user's computer and partly on a remote computer or entirely on the remote computer or server. In the latter scenario, the remote computer may be connected to the user's computer through any type of network, such as network 114, through a communication interface, such as network interface 732, over a network link that may be connected, for example, to network 114.

In the example, network interface 732 includes an adapter 734 for connecting computer system 700 to network 114 through a link. Although not depicted, network interface 732 may include additional software, such as device drivers, additional hardware and other controllers that enable communication. When implemented as a server, computer system 700 may include multiple communication interfaces accessible via multiple peripheral component interconnect (PCI) bus bridges connected to an input/output controller, for example. In this manner, computer system 700 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 700, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 700, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 732, the network link to network 114, and network 114 may use electrical, electromagnetic, or optical signals that carry digital data streams. The signals through the various networks and the signals on network 114, the network link to network 114, and network interface 732 which carry the digital data to and from computer system 700, may be forms of carrier waves transporting the information.

In addition, computer system 700 may include multiple peripheral components that facilitate input and output. These peripheral components are connected to multiple controllers, adapters, and expansion slots, such as input/output (I/O) interface 726, coupled to one of the multiple levels of bus 722. For example, input device 724 may include, for example, a microphone, a video capture device, an image scanning system, a keyboard, a mouse, or other input peripheral device, communicatively enabled on bus 722 via I/O interface 726 controlling inputs. In addition, for example, output device 720 communicatively enabled on bus 722 via I/O interface 726 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 7 may vary. Furthermore, those of ordinary skill in the art will appreciate that the depicted example is not meant to imply architectural limitations with respect to the present invention.

FIG. 8 illustrates a high level logic flowchart of a process and program for managing card status updates by a communication device that monitors for the presence of a card. In the example, the process starts at block 800 and thereafter proceeds to block 802. Block 802 illustrates sending a status update with an association request for the card with the communication device identifier to the account system. Next, block 804 illustrates a determination whether an association confirmation is received from the account system. If an association confirmation is not received, then the process passes to block 802. If an association confirmation is received, then the process passes to block 806. Block 806 illustrates receiving and storing user specified time and user specified distance limits for the card. Next, block 808 depicts synching the phone sensor to sense the card within the range specified by the user defined distance limit. Thereafter, block 810 illustrates a determination whether the card sensor detects the card leave the range. If the card leaves the range, then the process passes to block 812. Block 812 illustrates starting a counter to count the time the card is outside the range, and the process passes to block 814.

Block 814 depicts a determination whether the card is back in the range or possession of the user. At block 814, if the card is back in the range or possession of the user, then the process passes to block 808. At block 814, if the card is not back in the range or possession of the user, the process passes to block 816.

Block 816 illustrates a determination whether the counted time is greater than the user specified time limit. At block 816, if the counted time is not greater than the user specified time limit for the card, then the process returns to block 814. At block 816, if the counted time is greater than the user specified time limit, then the process passes to block 818.

Block 818 illustrates sending a status update to the account system to place a hold on the account for the card. Next, block 820 depicts a determination whether the hold confirmation is received from the account system. At block 820, if a hold confirmation is not received, then the process passes to block 824. Block 824 illustrates outputting an alert to the user that the hold request is not confirmed, and the process passes to block 826. At block 820, if a hold confirmation is received, then the process passes to block 822. Block 822 illustrates outputting an alert to the user that the account for the card is placed on hold, and the process passes to block 826.

Block 826 depicts a determination whether the card is returned within the range. If the card is not returned within the range, then the process maintains the card as on hold. If the card is returned to the user, then the process passes to block 828. Block 828 illustrates sending a status update to the account system to reactivate the card, and the process passes to block 808.

FIG. 9 illustrates a high level logic flowchart of a process and program for managing a user account associated with a card responsive to status updates received from a user communication device associated with the card. In the example, the process starts at block 900 and thereafter proceeds to block 902. Block 902 depicts a determination whether an account status provider receives a status update from a user communication device. If an account status provider receives a status update from a user communication device, then the process passes to block 904. Block 904 illustrates a determination whether the status update is an association request.

At block 904, if the status update is an association request, then the process passes to block 906. Block 906 illustrates storing the device identifier with the account information for the card identified in the status request. Next, block 908 depicts setting the account to a status of "associated" and subject to communication device based status adjustments, as long as the account authorizes communication device associations. Thereafter, block 910 illustrates sending an association confirmation to the user communication device, and the process returns to block 902.

At block 904, if the status update is not an association request, then the process passes to block 912. Block 912 depicts a determination whether the status update is a hold request. At block 912, if the status update is a hold request, then the process passes to block 914. Block 914 illustrates a determination whether the hold request is received from an associated communication device for the account specified by the card identified in the status update. At block 914, if the hold request is not received from an associated communication device, then an error may be returned to the user communication device and the process passes to block 902. At block 914, if the hold request is received from an associated communication device, then the process passes to block 916. Block 916 illustrates setting the account status to "hold". Next, block 918 depicts storing the time and location information received with the hold request in association with the account. Thereafter, block 920 illustrates identifying any transaction requests received following the time when the card was detected outside the range, where the time the card left the range is specified in the status update. Next, block 922 depicts sending a hold confirmation to the communication device with a list of any identified transaction requests, and the process returns to block 902.

At block 912, if the status update is not a hold request, then the process passes to block 924. Block 924 illustrates a determination whether the status update is a reactivation request. At block 924, if the status update is a reactivation request, then the process passes to block 928. Block 928 illustrates a determination whether the activation request is received from an associated communication device for the account specified by the card identified in the status update. At block 928, if the reactivation request is not received from an associated communication device, then an error may be returned to the user communication device and the process passes to block 902. At block 928, if the reactivation request is received from an associated communication device, then the process passes to block 930. Block 930 illustrates setting the account status to "reactivated". Next, block 932 depicts storing the time and location information received with the reactivation request indicating the time the card was returned to the range and the location of the user communication device when the card was returned to the range, if available in the status update. Thereafter, block 934 illustrates sending a reactivation confirmation to the communication, and the process returns to block 902.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for controlling a status of an account associated with a card, comprising:

detecting, by a sensor of a communication device, whether a portable card associated with an account for a user is present within a range, wherein the communication device is a portable communication device carried by the user that moves among a plurality of locations;

responsive to the sensor detecting the card, identifying, by the communication device, the card by a card identifier detected by the sensor;

responsive to the sensor detecting the card, controlling, by the communication device, an interface with a first selectable option for the user to select to activate the card;

responsive to receiving a selection of the first selectable option by the user to activate the card, sending, by the communication device, a first request from the communication device to an account provider system to activate an account status for the card, wherein the account status is set to activated by the account provider system, wherein the account provider system authorizes transaction requests for transactions on the account associated with the card;

responsive to receiving an activation confirmation from the account provider system, controlling, by the communication device, the interface with a second selectable option for the user to associate the card by the card identifier with the communication device;

responsive to receiving a selection of the second selectable option by the user to associate the card identifier with the communication device, sending, by the communication device, a second request from the communication device to the account provider system to associate an identifier for the communication device with the account associated with the card;

responsive to receiving an association confirmation from the account provider system indicating the identifier for the communication device is associated with the account, updating, by the communication device, a status for the card as maintained by the communication device as associated;

controlling, by the communication device, the interface with a third selectable option for the user to set limits specified for the card identifier only from among a plurality of cards associated with the communication device;

responsive to receiving a selection of the third selectable option by the user to associate a distance specified by the user as the range and to specify a time specified by the user as a user specified time limit, to set the range to the distance and to set the user specified time limit to the time specified by the user;

synchronizing, by the communication device, the sensor of the communication device to detect the card when present within the range and to monitor a time the card is outside the range in comparison with the user specified time limit;

responsive to detecting the card outside the range of the sensor longer than the user specified time limit, detecting a first location of the communication device when the card is detected outside the range of the sensor and sending a first communication with the first location from the communication device to the account provider system via a network for the card to automatically place the account associated with the card on hold; and responsive to detecting the card return within the range of the sensor, detecting a second location of the communication device when the card is detected within the range of the sensor and sending a second communication with the second location from the communication device to the account provider system via the network to automatically reactivate the account associated with the card.

2. The method according to claim 1, further comprising:
controlling, by the communication device, an interface with an additional selectable option for the user to select a distance limit from among a plurality of distance limit options in association with the card only from among the plurality of cards associated with the communication device;

receiving, by the communication device, a user selection of a particular distance limit in association with the card through the user selection of the particular distance limit through the additional selectable option;

specifying, by the communication device, the range by the particular distance limit; and selecting, by the communication device, a particular sensor with a sensor range meeting at least the particular distance limit from among a plurality of sensors at the communication device each with a separate sensor range, wherein the plurality of sensors monitor for the plurality of cards associated with the communication device; and detecting, by the communication device, when the card is outside of the particular distance limit while the card is still present within the sensor range of the particular sensor.

3. The method according to claim 1, further comprising:
receiving, by the communication device, a user selection of a particular frequency for detecting whether the card is present within the range; and checking, by the communication device, whether the card is present within the range at a frequency specified by the particular frequency.

4. The method according to claim 1, further comprising:
receiving, by the communication device, a user selection of the user specified time limit for the card;

responsive to detecting the card outside the range of the sensor, starting, by the communication device, a first timer to count an away time for the card;

comparing, by the communication device, the count in the first timer with the user specified time limit specified for the card; and responsive to the count in the first timer greater than the user specified time limited specified for the card, triggering, by the communication device, the first communication from the communication device to the account provider system for the card to automatically place the account associated with the card on hold.

5. The method according to claim 1, further comprising:
responsive to detecting the card outside the range of the sensor, detecting, by the communication device, the first location of the communication device; and responsive to the time the card is outside the range of the sensor exceeding the user defined time limit, outputting, by the communication device, a map marking the first location of the communication device.

6. The method according to claim 1, further comprising:
responsive to triggering the first communication from the communication device, monitoring, by the communication device, for a hold confirmation from the account provider system;

responsive to receiving the hold confirmation from the account provider system, controlling output, by the communication device, of an alert to the user specifying that the account associated with the card is placed on hold; and responsive to not receiving the hold confirmation from the account provider system, controlling output, by the communication device, of an alert to the user specifying that the request to hold the card is not confirmed.

7. The method according to claim 1, further comprising:
responsive to receiving a reactivation confirmation from the account provider system specifying the account associated with the card is reactivated, resynchronizing, by the communication device, the sensor of the communication device to detect whether the card associated with the account is present within the range.

8. A system for controlling a status of an account associated with a card, comprising:
a communication device comprising a sensor;
the sensor, operative to detect whether a portable card associated with an account for a user is present within a range, wherein the communication device is a portable communication device carried by the user that moves among a plurality of locations;

the communication device operative, responsive to the sensor detecting the card, to identify the card by a card identifier detected by the sensor;

the communication device operative, responsive to the sensor detecting the card, to control an interface with a first selectable option for the user to select to activate the card;

the communication device operative, responsive to receiving a selection of the first selectable option by the user to activate the card, to send a first request from the communication device to an account provider system to activate an account status for the card, wherein when the account status is set to activated by the account provider system, wherein the account provider system authorizes transaction requests for transactions on the account associated with the card;

the communication device operative, responsive to receiving an activation confirmation from the account provider system, to control the interface with a second selectable option for the user to associate the card by the card identifier with the communication device;

the communication device operative, responsive to receiving a selection of the second selectable option by the user to associate the card by the card identifier with the communication device, to send a second request from the communication device to the account provider system to associate an identifier for the communication device with the account associated with the card;

the communication device, responsive to receiving an association confirmation from the account provider system indicating the identifier for the communication device is associated with the account, operative to update a status for the card as maintained by the communication device as associated;

the communication device operative to control the interface with a third selectable option for the user to set limits specified for the card identifier only from among a plurality of cards associated with the communication device;

the communication device operative, responsive to receiving a selection of the third selectable option by the user to associate a distance specified by the user as the range and to specify a time specified by the user as a user specified time limit, to set the range to the distance and to set the user specified time limit to the time specified by the user;

the communication device operative to synchronize the sensor of the communication device to detect the card when present within the range and to monitor a time the card is outside the range in comparison with the user specified time limit;

the communication device, responsive to detecting the card outside the range of the sensor longer than the user specified time limit, operative to detect a first location of the communication device when the card is detected outside the range of the sensor and send a first communication with the first location from the communication device to the account provider system via a network for the card to automatically place the account associated with the card on hold; and the communication device, responsive to detecting the card return within the range of the sensor, operative to detect a second location of the communication device when the card is detected within the range of the sensor and send a second communication with the second location from the communication device to the account provider system via the network to automatically reactivate the account associated with the card.

9. The system according to claim 8, further comprising:

the communication device operative to control an interface with an additional selectable option for the user to select a distance limit from among a plurality of distance limit options in association with the card only from among the plurality of cards associated with the communication device;

the communication device operative to receive the user selection of a particular distance limit in association with the card through the user selection of the particular distance limit through the additional selectable option;

the communication device operative to specify the range by the particular distance limit;

the communication device operative to select a particular sensor with a sensor range meeting at least the particular distance limit from among a plurality of sensors at the communication device each with a separate sensor range, wherein the plurality of sensors monitor for the plurality of cards associated with the communication device; and the communication device operative to detect when the card is outside of the particular distance limit while the card is still present within the sensor range of the particular sensor.

10. The system according to claim 8, further comprising:

the communication device operative to receive a user selection of a particular frequency for detecting whether the card is present within the range; and the communication device operative to check whether the card is present within the range at a frequency specified by the particular frequency.

11. The system according to claim 8, further comprising:

the communication device operative to receive a user selection of the user specified time limit for the card;

the communication device, responsive to detecting the card outside the range of the sensor, operative to start a first timer to count an away time for the card;

the communication device operative to compare the count in the first timer with the user specified time limit specified for the card; and the communication device, responsive to the count in the first timer greater than the user specified time limited specified for the card, operative to trigger the first communication from the communication device to the account provider system for the card to automatically place the account associated with the card on hold.

12. The system according to claim 8, further comprising:

the communication device, responsive to the time the card is outside the range of the sensor exceeding the user defined time limit, operative to output a map marking the detected location of the communication device at the time when the card was detected outside the range of the sensor.

13. The system according to claim 8, further comprising:

the communication device, responsive to triggering the first communication from the communication device, operative to monitor for a hold confirmation from the account provider system;

the communication device, responsive to receiving the hold confirmation from the account provider system, operative to control output of an alert to the user specifying that the account associated with the card is placed on hold; and the communication device, responsive to not receiving the hold confirmation from the account provider system, operative to control output of an alert to the user specifying that the request to place the account associated with the card on hold is not confirmed.

14. The system according to claim 8, further comprising:
responsive to receiving a reactivation confirmation from the account provider system specifying the account associated with the card is reactivated, resynchronizing the sensor of the communication device to detect whether the card associated with the account is present within the range.

15. The system according to claim 8, further comprising:
the communication device operative to detect whether the portable card associated with the account is present within the range set to a distance to allow the user to carry the card in one place concurrent with the user conversing via the communication device, without the card leaving the range.

16. A computer program product for controlling a status of an account associated with a card, said computer program product tangibly embodied in a non-transitory computer-readable storage medium and comprising computer executable instructions which cause a computer to:
detect, by a communication device, whether a portable card associated with an account for a user is present within a range, wherein the communication device is a portable communication device carried by the user that moves among a plurality of locations;
responsive to the sensor detecting the card, identify the card by a card identifier detected by the sensor;
responsive to the sensor detecting the card, control an interface with a first selectable option for the user to select to activate the card;
responsive to receiving a selection of the first selectable option by the user to activate the card, send a first request from the communication device to an account provider system to activate an account status for the card, wherein when the account status is set to activated by the account provider system, wherein the account provider system authorizes transaction requests for transactions on the account associated with the card;
responsive to receiving an activation confirmation from the account provider system, control the interface with a second selectable option for the user to associate the card by the card identifier with the communication device;
responsive to receiving a selection of the second selectable option by the user to associate the card by the card identifier with the communication device, send a second request from the communication device to the account provider system to associate an identifier for the communication device with the account associated with the card;
responsive to receiving an association confirmation from the account provider system indicating the identifier for the communication device is associated with the account, update a status for the card as maintained by the communication device as associated;
control the interface with a third selectable option for the user to set limits specified for the card identifier only from among a plurality of cards associated with the communication device;
responsive to receiving a selection of the third selectable option by the user to associate a distance specified by the user as the range and to specify a time specified by the user as the user specified time limit, set the range to the distance and to set the user specified time limit to the time specified by the user;
synchronize the sensor of the communication device to detect the card when present within the range and to monitor a time the card is outside the range in comparison with the user specified time limit;
responsive to detecting the card outside the range of the sensor longer than the user specified time limit, detect a first location of the communication device when the card is detected outside the range of the sensor and send a first communication with the first location from the communication device to the account provider system via a network for the card to automatically place the account associated with the card on hold; and
responsive to detecting the card return within the range of the sensor, detect a second location of the communication device when the card is detected within the range of the sensor and send a second communication with the second location from the communication device to the account provider system via the network to automatically reactivate the account associated with the card.

17. The computer program product according to claim 16, further comprising computer executable instructions which cause the computer to:
receive a user selection of a particular distance limit in association with the card;
specify the range by the particular distance limit; and
select a particular sensor with a sensor range meeting at least the particular distance limit from among a plurality of sensors at the communication device each with a separate sensor range.

18. The computer program product according to claim 16, further comprising computer executable instructions which cause the computer to:
receive a user selection of the user specified time limit for the card;
responsive to detecting the card outside the range of the sensor, start a first timer to count an away time for the card;
compare the count in the first timer with the user specified time limit specified for the card; and
responsive to the count in the first timer greater than the user specified time limited specified for the card, trigger the first communication from the communication device to the account provider system for the card to automatically place the account associated with the card on hold.

19. The computer program product according to claim 16, further comprising computer executable instructions which cause the computer to:
detect whether the portable card associated with the account is present within the range set to a distance to allow the user to carry the card in one place concurrent with the user conversing via the communication device, without the card leaving the range.

* * * * *